(12) United States Patent
Lee et al.

(10) Patent No.: US 10,401,938 B1
(45) Date of Patent: Sep. 3, 2019

(54) SINGLE POWER PLANE DYNAMIC VOLTAGE MARGIN RECOVERY FOR MULTIPLE CLOCK DOMAINS

(71) Applicant: Apple Inc., Cupertino, CA (US)

(72) Inventors: Jong-Suk Lee, Sunnyvale, CA (US); Ramesh B. Gunna, San Jose, CA (US); Shih-Chieh R. Wen, San Jose, CA (US); John H. Mylius, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 15/483,178

(22) Filed: Apr. 10, 2017

(51) Int. Cl.
*G06F 1/00* (2006.01)
*G06F 1/324* (2019.01)
*G06F 1/3287* (2019.01)
*G06F 1/3296* (2019.01)

(52) U.S. Cl.
CPC ............ *G06F 1/324* (2013.01); *G06F 1/3287* (2013.01); *G06F 1/3296* (2013.01)

(58) Field of Classification Search
CPC ...................................................... G06F 1/324
See application file for complete search history.

(56) References Cited

U.S. PATENT DOCUMENTS

| | | | | |
|---|---|---|---|---|
| 10,101,788 | B2 * | 10/2018 | Mylius | ................... G06F 1/3209 |
| 2007/0035995 | A1 * | 2/2007 | Crippa | ................ G11C 11/5628 |
| | | | | 365/185.03 |
| 2009/0244962 | A1 * | 10/2009 | Gordon | ..................... G11C 8/10 |
| | | | | 365/163 |
| 2012/0072746 | A1 | 3/2012 | Sotomayor | |
| 2014/0164860 | A1 * | 6/2014 | Kim | ............... G01R 31/318536 |
| | | | | 714/731 |
| 2015/0253836 | A1 | 9/2015 | Mylius et al. | |
| 2015/0277536 | A1 | 10/2015 | Vanka et al. | |
| 2017/0052219 | A1 * | 2/2017 | Knoth | ................ G01R 19/2509 |
| 2017/0068309 | A1 * | 3/2017 | Toosizadeh | ........... G06F 1/3296 |

* cited by examiner

*Primary Examiner* — Mohammed H Rehman
(74) *Attorney, Agent, or Firm* — Meyertons Hood Kivlin Kowert and Goetzel PC; Rory D. Rankin

(57) ABSTRACT

Systems, apparatuses, and methods for reaching power targets across different clock domains are described. In various embodiments, a first processor complex and a second processor complex operate while powered by a same, single power plane, but with respective clock domains. When a request is detected to change an operating mode of a particular core from one of the processor complexes to an operating mode which does not provide the worst-case power supply load on the single power plane, an amount of voltage margin to recover from the operational voltage is determined based on the second operating mode prior to granting the request and based on each other core in the complexes operating in respective current operating modes. An operational voltage less the determined voltage margin to recover is assigned to the processor complexes while different clock frequencies are assigned to the processor complexes.

14 Claims, 7 Drawing Sheets

US 10,401,938 B1

SINGLE POWER PLANE DYNAMIC VOLTAGE MARGIN RECOVERY FOR MULTIPLE CLOCK DOMAINS

BACKGROUND

Technical Field

Embodiments described herein relate to the field of integrated circuits and, more particularly, to management of operating modes for reaching power targets across different clock domains.

Description of the Related Art

A computing system such as a semiconductor chip includes multiple functional blocks or units, each capable of processing data. In various embodiments, the multiple functional units are individual dies on one of a system on a chip (SOC), a multi-chip module (MCM) or a printed circuit board. Examples of functional units are general-purpose processors with one or more cores in a central processing unit (CPU), highly parallel data architected processors with one or more cores in graphics processing units (GPUs) and digital signal processors (DSPs), display controllers, audio processing components, networking components, peripheral interface controllers, memory controllers, and so on.

Control logic, such as a power management unit, within the computing system determines one or more operating states for the different functional units. The operating state includes a power supply voltage and an operational clock frequency. Clock generating circuitry generates different clock signals at the one or more specified different frequencies, whereas a power distribution network provides the one or more specified different power supply voltages. This on-chip network uses power supplies and regulation circuits to generate the specified different power supply voltages for use by the devices within the functional units. Additionally, the network relies on a pair of on-chip planes where one voltage plane (metal layer) is dedicated to the power supply voltage and another ground plane (metal layer) is dedicated to the ground value.

When devices in the functional units draw current from the power and ground planes, the changes in the demand of current creates both a current-resistance (IR) drop and a transient voltage drop. The current-resistance drop is caused by the distributed resistance across the planes, resistance in any other conductors between each of the functional units and the power supplies and regulation circuits, and resistive loads within the functional units. The transient voltage drop is caused by the distributed inductance (L) across the planes and the transient current (di/dt) resulting from the current demand changes. The combination of the current-resistance (IR) drop and the transient voltage drop is referred to as a voltage droop. Although the duration of the voltage droop is temporary, the voltage droop causes unreliable behavior for both the devices causing the droop and neighboring devices.

To protect against unreliable behavior and possible malfunction of the functional units from voltage droop, a voltage margin is added to the power supply voltages corresponding to the supported operating states. The voltage margin is based on worst-case operating conditions to account for the worst-case IR and L*di/dt effects. Accordingly, power consumption increases as the power supply voltages increase. Power consumption also increases even when actual conditions are not the worst-case conditions. Consequently, power consumption is increased even though the computing system is operating on workloads which do not reach worst-case conditions.

SUMMARY

Systems and methods for management of operating modes for reaching power targets across different clock domains are contemplated. In various embodiments, a computing system, such as a semiconductor chip, includes a first processor complex and a second processor complex, each powered by a same, single power plane, but operating with respective clock domains. Each of the multiple cores in the first processor complex and the second processor complex operates in one of multiple operating modes. More than one of the operating modes do not provide a worst-case power supply load. A power state controller receives a request to change an operating mode of a particular core to an operating mode which does not provide the worst-case power supply load on the single power plane. The particular core is from either the first processor complex or the second processor complex.

The power state controller determines an amount of voltage margin to recover from the operational voltage based on at least the second operating mode prior to granting the request. In doing so, the power state controller generates a total weight based on the particular core operating in the requested second operating mode prior to the particular core being assigned the second operating mode. The generated total weight is also based on each other core in the first processor complex and the second processor complex operating in respective current operating modes. A set of one or more weight thresholds corresponding to the one or more supply voltage reductions is selected based on the operational voltage to assign to each of the first processor complex and the second processor complex. The generated total weight is compared to the set of one or more weight thresholds to select the amount of recovered voltage margin prior to granting the request. The first processor complex is assigned a first clock frequency in a first clock domain based on the assigned operational voltage. The second processor complex is assigned a second clock frequency in a second clock domain based on the assigned operational voltage. The second clock frequency is different from the first clock frequency.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

PICK UP

Figure 1:
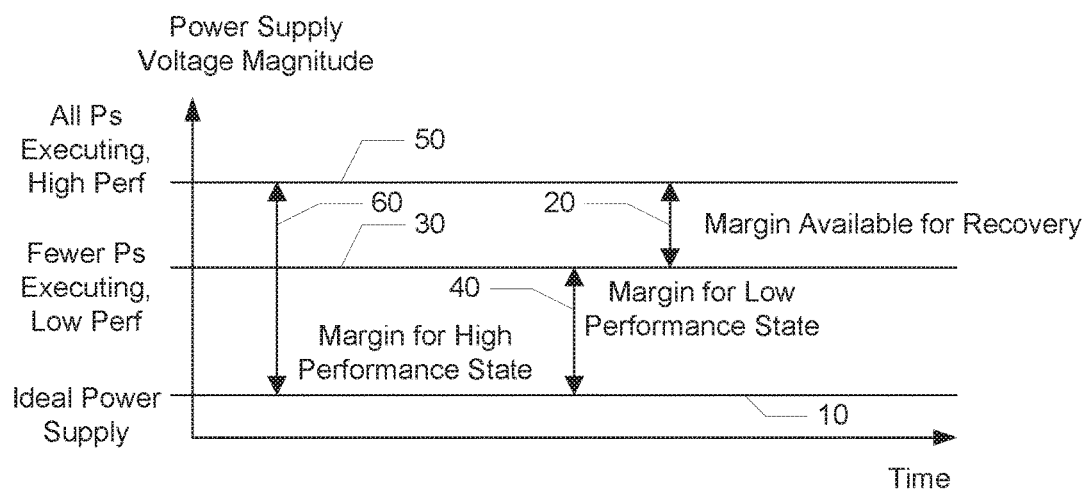
FIG. 1 is a block diagram of one embodiment of voltages and potential voltage margin recovery.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning now to FIG. 1, a diagram is shown illustrating minimum power supply voltage magnitudes that would be safe to use for different operating modes of the processors in a computing system such as a system on a chip (SOC). Three lines 10, 30 and 50 are shown as well as three margins 20, 40 and 60. Line 10 represents the minimum power supply voltage magnitude at which the processors are designed to operate correctly. That is, in the absence of power supply voltage variation due to current-resistance (IR) and transient current (L*di/dt) voltage droop, and other such factors, the power supply voltage magnitude represented by line 10 would be sufficient to ensure correct operation of the processors. Viewed in another way, line 10 is the power supply voltage magnitude that would be sufficient on an ideal power supply (no impedance and infinite current capacity) supplying power directly to the processors.

Line 50 represents the minimum safe power supply voltage magnitude if all the processors are active, executing in a high performance mode which permits worst-case power supply load from each processor. The supply voltage magnitude represented by line 50 includes a margin (represented by line 60) over the ideal supply minimum to ensure correct operation with any supply voltage variation introduced due to "real world" factors such as impedance (e.g. resistance and inductance) in the power supply distribution planes and interconnect to the package pins, L*di/dt transient effects, etc.

Line 30 represents an intermediate power supply voltage magnitude. The intermediate level would be safe to use if the worst-case power supply load is not possible from the processors (or at least some of the processors). For example, fewer than all of the processors may be executing (e.g. some may be clock gated or power gated). If not all of the processors are executing, then even if the executing processors are in the high performance mode, the total load on the power supply may be less than the worst-case possible load if all the processors were executing in the high performance mode. Additionally or alternatively, one or more of the processors may be executing in a low performance state that does not permit the worst-case load on the power supply load to be presented by those processors. Both inactive processors and low performance state processors may be factors in the reduced safe power supply voltage. Because of these factors, a lower margin (represented by the line 40 in FIG. 1) may be supported.

Thus, if the modes of the processors were externally controllable, so that the transition between modes may not occur unless the external controller permits the transitions, a portion of the voltage margin that has been built-in to the power supply voltage magnitude may be recovered (represented by the line 20 in FIG. 1). Because power supply voltage magnitude changes take some time to perform, actually recovering the available margin may be predicated on the ability to externally control the transition of processors to a higher performance (and potentially higher power supply load) mode. Processors that are power gated need to be powered on to transition to a higher power mode (e.g. any "on" mode), and thus that transition may be controlled externally since the power supply is controlled externally. For clock-gated cases and cases in which the state of the processor is a lower performance, but still executing, mode may be controlled via the addition of a communication between the processor and the external controlling logic (e.g. the automatic power state controller described below). The processor may detect that a transition to a different performance state is desired, and may request the transition from the automatic power state controller. The automatic power state controller may ensure that a power supply voltage magnitude increase is not needed to permit the transition, or may cause the power supply voltage increase, then may permit the transition to occur. Transitions to lower performance modes may be permitted and, if applicable, a lower power supply voltage magnitude may be established. The lower power supply voltage magnitude need not be established before permitting the transition, because the processor will operate properly at the higher voltage magnitude.

With the controllability provided by the interface between the processors and the automatic power state controller, the voltage margin (or a portion thereof) may be safely and dynamically recovered based on the modes in which the processors are operating. In this case, the voltage margin may be changed while the processor frequency remains constant. In another embodiment, processor frequency may be increased when the processor modes indicate less than worst-case load. In still another embodiment, a combination of power supply voltage decrease and frequency increase may be implemented. For example, a boost state may be implemented for cases in which few processors are executing, but they are executing in the high performance mode. In the boost state, a higher frequency may be used. The automatic power state controller may monitor mode transitions from other processors, and may transition to a different state if the combination of modes presents the potential for power supply load greater than the boost state may safely support. In the other modes, voltage margin recovery may be performed by reducing the power supply voltage magnitude. Other embodiments may include more boost states if desired. The recovery of margin by decreasing power supply voltage magnitude may be referred to herein as dynamic voltage margin recovery-voltage (DVMR-V). The recovery of margin by increasing the frequency may be referred to as DVMR-Frequency (DVMR-F).

While the above discussion and various embodiments below describe the recovery of voltage margin for processors, DVMR may be applied to other components of an integrated circuit as well. Generally, any component that supports more than one mode, and at least one of the modes ensures that worst-case power supply load will not be presented by the component, may employ DVMR. Transitions between the modes may be controllable as discussed above, using an interface between the component and the automatic power state controller. Multiple components may be controllable in this fashion, similar to the above discussion and the description below of multiple processors. Generally, a component may be any discretely-defined circuitry that performs a defined set of functionality in the overall integrated circuit. There may be multiple instances of a component (e.g. multiple processors). The instances may be substantially identical, although there may be some differences. For example, instances of the processors may include a CPU ID that identifies which instance the processor is. The CPU ID for each processor may be different.

Figure 2:
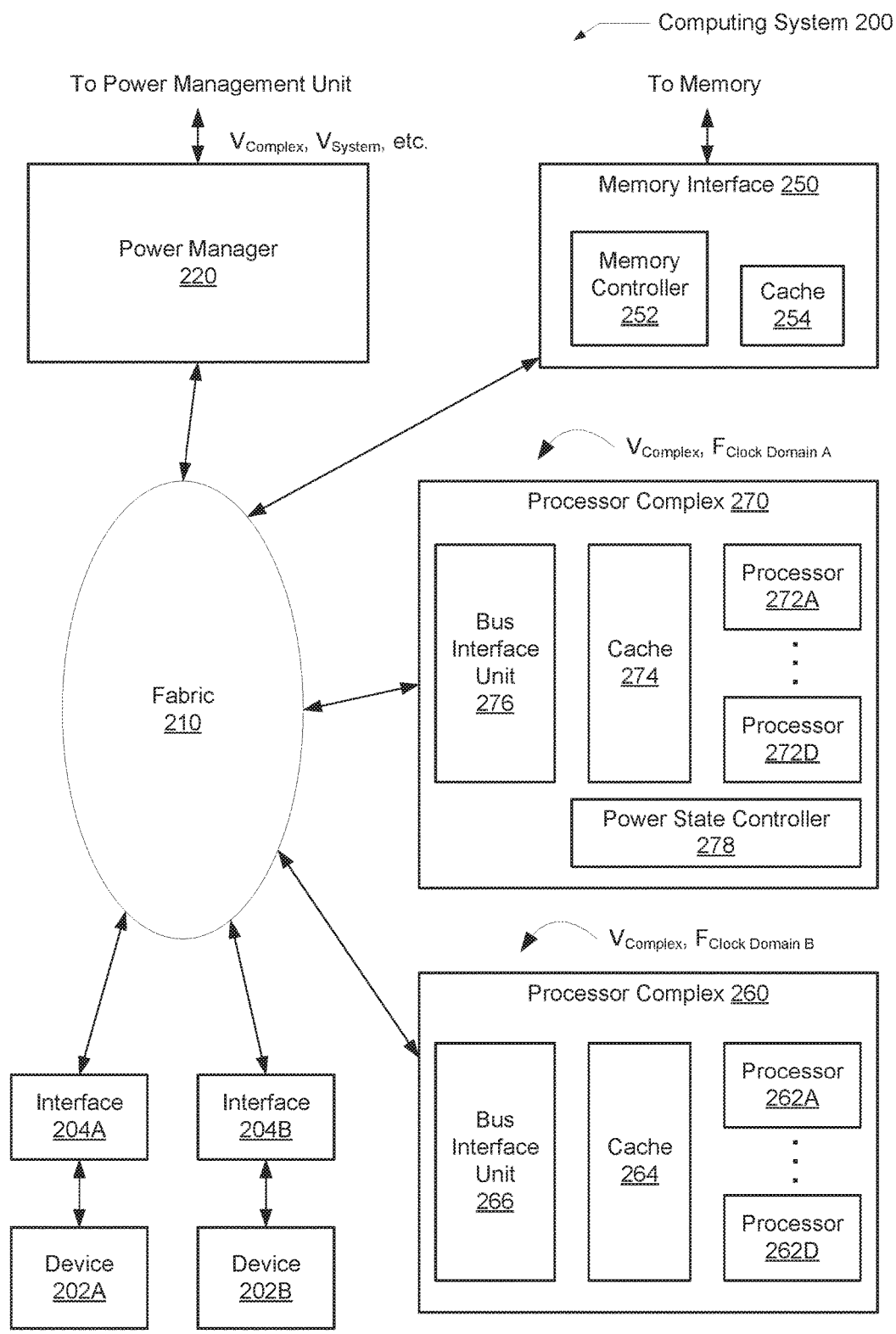
FIG. 2 is a block diagram of one embodiment of a computing system.

Turning now to FIG. 2, a generalized block diagram of one embodiment of a computing system 200 capable of handling interrupts with non-zero latency tolerances is shown. As shown, a communication fabric 210 routes traffic between the devices 202A-202B, the memory interface 250, the power manager 220 and the processor complexes 260-270. In various embodiments, the computing system 200 is a system on a chip (SOC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), various input/output (I/O) interfaces, interrupt controllers, and so forth are not shown in FIG. 2 for ease of illustration. It is also noted that the number of components of the computing system 200 (and the number of subcomponents for those shown in FIG. 2, such as within each of the processor complexes 260-270) may vary from embodiment to embodiment. There may be more or fewer of each component/subcomponent than the number shown for the computing system 200.

In various embodiments, different types of traffic flows independently through the fabric 210. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 210 may also be packet-based, and may be hierarchical with bridges, cross bar, point-to-point, or other interconnects.

The power manager 220 may be configured to control the supply voltage magnitudes requested from the external power management unit. There may be multiple supply voltages generated by the external power management unit for the computing system 200. For example, in the illustrated embodiment are a $V_{Complex}$ for each of the processor complexes 260-270 and a $V_{System}$ for one or more other components in the computing system 200. There may be multiple supply voltages for the rest of the computing system 200, in some embodiments. In other embodiments, there may also be a memory supply voltage for various memory arrays in the processor complexes 260-270 and the rest of the computing system 200. The memory supply voltage may be used with the voltage supplied to the logic circuitry (e.g. $V_{Complex}$ or $V_{System}$), which may have a lower voltage magnitude than that required to ensure robust memory operation.

In some embodiments, logic local to various components (e.g. the power state controller 278) may control the power states of the components, including power up and power down and various other power-performance states (P-states) and operating modes for those components that support more than one P-state and operating mode. In various embodiments, the P-state is used to determine the operational voltage and operational frequency used by a component, whereas the operating mode determines how many subcomponents are powered up such as particular execution pipelines.

In other embodiments, the power manager 220 may control power up and power down of other components of the computing system 200, or a combination of local control for some components and control by the power manager 220 for other components may be supported. The power manager 220 may be under direct software control (e.g. software may directly request the power up and/or power down of components) and/or may be configured to monitor the computing system 200 and determine when various components are to be powered up or powered down.

The external power management unit may generally include the circuitry to generate supply voltages and to provide those supply voltages to other components of the system such as the computing system 200, the off-die memory, various off-chip peripheral components (not shown in FIG. 2) such as display devices, image sensors, user interface devices, etc. The external power management unit may thus include programmable voltage regulators, logic to interface to the computing system 200 and more particularly the power manager 220 to receive voltage requests, etc.

In various embodiments, each of the processor complexes 260-270 operate with a same supply voltage (e.g., $V_{Complex}$) from a single power plane while also operating with different clock frequencies source from different clock domains. As shown, the processor complex 270 uses the voltage magnitude $V_{Complex}$ as an operational supply voltage and the clock frequency $F_{Clock\ Domain\ A}$ from a first clock domain. The processor complex 260 uses the same voltage magnitude $V_{Complex}$ as an operational supply voltage, but the clock frequency $F_{Clock\ Domain\ B}$ from a different, second clock domain.

As used herein, the term "processor complex" is used to denote a configuration of one or more processor cores using local storage, such as a shared cache memory subsystem, and configured to process a workload together. Additionally, the processor complex is coupled through a communication channel subsystem to other components. As shown, processor complex 270 uses a bus interface unit (BIU) 276 for providing memory access requests and responses to at least the processors 272A-272D. Processor complex 270 also supports a cache memory subsystem which includes at least cache 274. In some embodiments, the cache 552 is a shared off-die level two (L2) cache for the processors 272A-272D although an L3 cache is also possible and contemplated. Processor complex 270 also uses an interface (not shown) for communication with the fabric 210.

In some embodiments, the processors 272A-272D use a homogeneous architecture. For example, each of the processors 272A-272D is a general-purpose processor, such as a central processing unit (CPU), which utilizes circuitry for executing instructions according to a predefined general-purpose instruction set. For example, the ARM®, x86®, x86-64®, Alpha®, MIPS®, PA-RISC®, SPARC® or any other instruction set architecture may be selected. In some embodiments, each core within a CPU supports the out-of-order execution of one or more threads of a software process and include a multi-stage pipeline.

In other embodiments, the processors 272A-272D use a heterogeneous architecture. In such embodiments, one or more of the processors 272A-272D is a highly parallel data architected processor, rather than a CPU. In some embodiments, these other processors of the processors 272A-272D use single instruction multiple data (SIMD) cores. Examples of SIMD cores are graphics processing units (GPUs), digital signal processing (DSP) cores, or otherwise.

In various embodiments, each one of the processors 272A-272D uses one or more cores and one or more levels of a cache memory subsystem. The processors 272A-272D use multiple one or more on-die levels (L1, L2, L2 and so forth) of caches for accessing data and instructions. If a requested block is not found in the on-die caches or in the off-die cache 274, then a read request for the missing block is generated and transmitted to the memory interface 250 or to on-die flash memory (not shown) controlled by a flash controller.

In some embodiments, the components 262A-262D, 264 and 266 of the processor complex 260 are similar to the components in the processor complex 270. In other embodiments, the components in the processor complex 260 are designed for lower power consumption, and therefore, include control logic and processing capability producing less performance. For example, supported clock frequencies may be less than supported clock frequencies in the processor complex 270. In addition, one or more of the processors 262A-262D may include a smaller number of execution pipelines and/or functional blocks for processing relatively high power consuming instructions than what is supported by the processors 272A-272D in the processor complex 270.

An instruction type, in this context, may refer to the general operation of the instruction and/or the operand type operated on by the instruction. For example, instruction types may include load/store instructions, which read and write data from and to memory. Instruction types may further include arithmetic/logic instructions that operate on specific operand types (e.g. floating point, vector, integer, etc.). The relatively high power consuming instructions may be a particular type of instruction (e.g., floating point instructions may be higher power-consuming than media or integer instructions, or the media instructions may be the highest power consuming, etc.). Particular instructions within the type of instruction may be higher than others (e.g., multiply-add floating point instructions may be higher power consuming instructions than other floating point instructions).

In one embodiment, the worst-case power consumption occurs in a particular one of the processors 262A-262D and 272A-272D when code containing the highest power consuming instructions is executed repeatedly in the particular processor. Which instructions is the highest power consuming instructions varies from implementation to implementation of the processors 262A-262D and 272A-272D. For the highest power consuming instruction type, one or more of the processors 262A-262D and 272A-272D may include multiple execution pipelines that execute instruction of that type. One or more of these processors may be configured to enable and disable a subset of the execution pipelines.

Generally, a particular one of the processors 262A-262D and 272A-272D may be active if it is powered up. The processor may be available for instruction execution with little delay (e.g., it may be clock gated, but may be ungated if instructions are ready to execute). The processor may be inactive if it is powered off or in another low power state in which a significant delay may be experienced before instructions may be executed. For example, if the processor requires a reset or a relock of a phase lock loop (PLL), it may be inactive even if it remains powered.

One or more of the processors 262A-262D and 272A-272D may be configured to monitor the mix of instructions being executed. If the relatively higher power consuming instructions are increasing in occurrence, and one or more of the execution pipelines are disabled, the processor may determine that one or more of the execution pipelines should be enabled. The processor may use an interface with the power state controller 278 to request the enabling of the pipelines, and may enable the pipelines when granted. Similarly, if the relatively higher power consuming instructions are decreasing in occurrence, the processor may determine that one or more execution pipelines should be disabled and may request the disabling of pipelines from the power state controller 278. By communicating the enable and disable of pipelines to the power state controller 278, the processors 262A-262D and 272A-272D permit the power state controller 278 to control the maximum power supply load of the processors 262A-262D and 272A-272D. Thus, some of the voltage margin may be reclaimed.

In various embodiments, the power state controller 278 includes queues for storing requests and control logic for determining operating modes for the processors 262A-262D and 272A-272D. In some embodiments, the operating modes indicate a number of execution pipelines to enable (or disable). If multiple pipelines are enabled, the worst-case power consumption of a particular processor is relatively high. If fewer pipelines are enabled, the worst-case power consumption of the particular processor is relatively low. The higher the power consumption, the larger the power supply load provided by the processor on the single power plane.

In various embodiments, the external power management unit determines the P-state for the processor complexes 260-270, and thus, the same operational voltage and respective operational clock frequencies. However, by at least determining the operating modes, the power state controller 278 determines whether to reduce the operational voltage by recovering (partially or wholly) the voltage margin included in the supply voltage magnitude. In addition, the power state controller 278 determines whether to reduce the one or more of the respective operational frequencies of the processor complexes 260-270.

In the illustrated embodiment, the power state controller 278 is shown within the processor complex 270. In this embodiment, the processor complex 260 transfers requests and responses to and from the processor complex 270 for possibly changing operating modes. However, in other embodiments, the functionality of the power state controller 278 is distributed among the processor complexes 260-270. In yet other embodiments, the functionality of the power state controller 278 is located in a separate control unit external to each of the processor complexes 260-270. Before continuing with further details of the determination of the voltage margin recovery, a further description of the remaining components of the computing system 200 is provided.

One or more of the number of the devices 202A-202B are on-chip devices. In addition, one or more of the devices 202A-202B are on-chip functional units. Alternatively, one or more of the devices 202A-202B are any variety of computer peripheral devices or other off-chip devices. Examples of the devices 202A-202B are audio, video, camera, and telephony controllers as well as various analog, digital, mixed-signal and radio-frequency (RF) functional units, and so on.

As shown, each of the devices 202A-202B uses a corresponding one of the fabric interfaces 204A-204B for transferring communication traffic. The corresponding fabric interfaces 204A-204B support a variety of communication protocols such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices may also include networking peripherals such as media access controllers (MACs) in the respective fabric interface.

One or more of the fabric interfaces 204A-204B may include queues for storing requests and corresponding response data. Additionally, one or more of the fabric interfaces 204A-204B may convert requests and responses as they go back and forth over different types of communication protocols. In some embodiments, the fabric interfaces 204A-204B determine an order between the read and write transactions of a corresponding one of the devices 202A-202B.

The memory interface 250 uses at least one memory controller 252 and at least one cache 254 for the off-chip memory, such as synchronous DRAM (SDRAM). The memory interface 250 stores memory requests in request queues, uses any number of memory ports, and uses circuitry configured to interface to memory using one or more of a variety of protocols used to interface with memory channels used to interface to memory devices (not shown). The memory interface 250 may be responsible for the timing of the signals, for proper clocking to synchronous DRAM memory, etc.

In various embodiments, one or more of the memory interface 250, an interrupt controller (not shown), and the fabric 210 uses control logic to ensure coherence among the different processors 262A-262D, 272A-272D and the devices 202A-202B. In some embodiments, this circuitry uses cache coherency logic employing a cache coherency protocol to ensure data accessed by each source is kept up to date. An example of a cache coherency protocol includes the MOESI protocol with the Modified (M), Owned (O), Exclusive (E), Shared (S), and Invalid (I) states.

Figure 3:
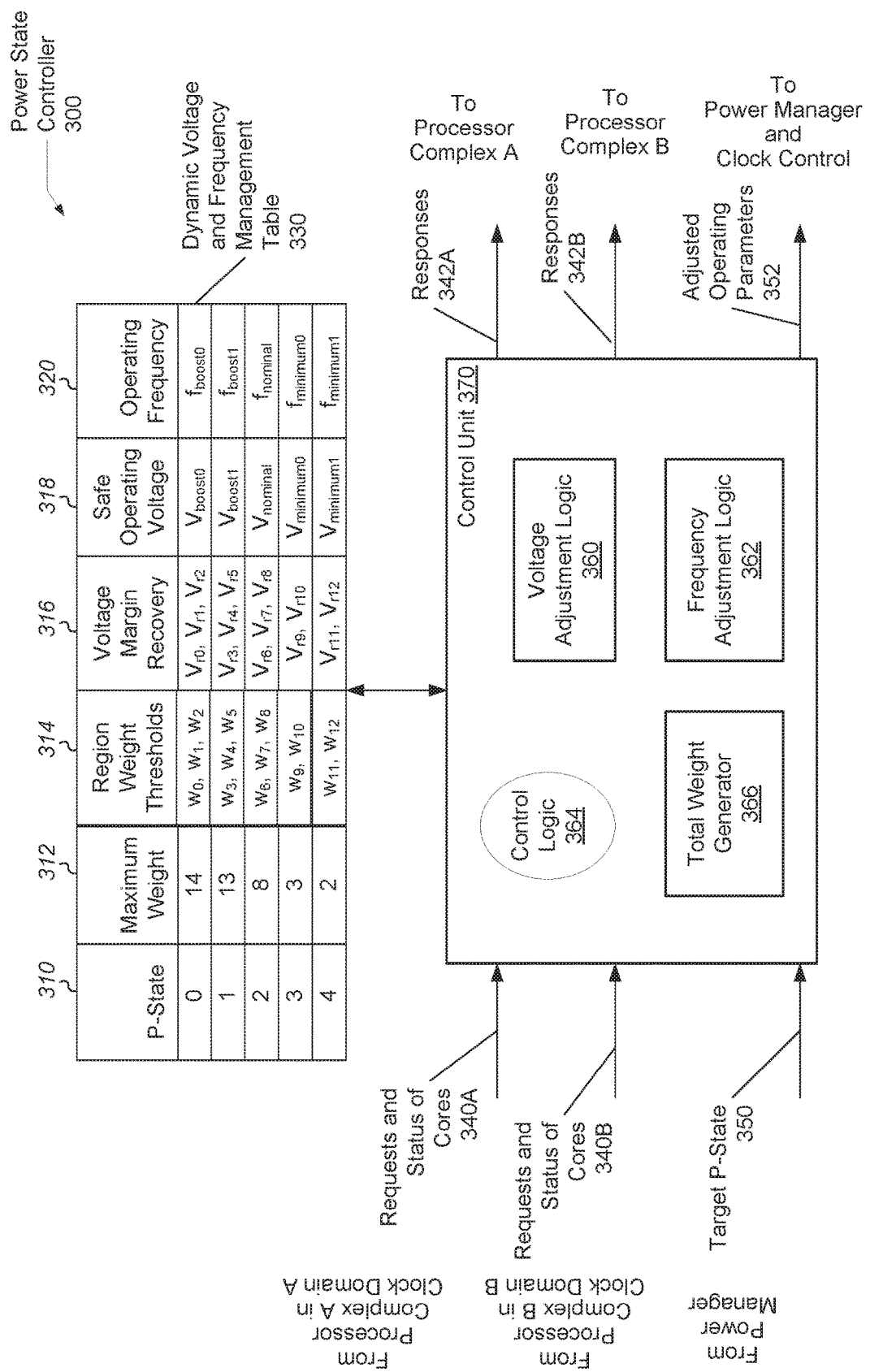
FIG. 3 is a block diagram of one embodiment of a power state controller.

Referring now to FIG. 3, a generalized block diagram of one embodiment of a power state controller 300 is shown. As shown, a control unit 370 receives requests and status 340A-340B from separate processor complexes and a target P-state from a power manager, which may originally be determined by a power management unit. The control unit also receives information from the dynamic voltage and frequency management (DVFM) table 330. The control unit conveys responses 342A-342B to the separate processor complexes and the adjusted operating parameters 352 to the power manager.

In various embodiments, one or more of the entries in the DVFM table 330 is programmable. The entries store information corresponding to one of the fields 310-320. A P-state is stored in field 310. Although only five discrete P-states are shown, it is well known another number of discrete P-states may be supported. In various embodiments, the endpoint discrete states represented by P-states 0 and 4 define a region of predictable performance. Configuring a processor to support multiple intermediate P-states between the endpoint P-states along a non-linear frequency versus voltage curve provides stable, optimal utilization of power and delivery of performance for the processor. The management of the P-states may conform to an industry standard such as the Advanced Configuration and Power Interface (ACPI) standard.

Field 312 stores a maximum weight. In various embodiments, a programmable maximum weight is maintained for each supported P-state. The maximum weight represents the maximum power supply load supported for the particular P-state. The term weight is used to identify a numerical value indicating a power supply load provided by the multiple cores of the multiple processor complexes on the single power plane. In various embodiments, larger weights indicate larger power supply loads and a larger possibility for voltage droop to occur while lower weights indicate smaller power supply loads and a smaller possibility for voltage droop to occur.

The maximum weight found in field 312 is used to determine whether a lower power P-state should be selected. The target P-state 350 is used to select a row in the DVFM table 330. The total weight generator 366 in the control unit 360 generates a total weight from the inputs 340A, 340B and 350. When the generated total weight exceeds the maximum weight found in the DVFM table 330, the frequency adjustment logic 362 selects a next lower P-state than the current target P-state 350. Accordingly, the respective operational clock frequencies for the separate processor complexes may be lowered too.

The inputs 340A and 340B are from separate processor complexes sharing a single power plane but using different clock domains. In various embodiments, the inputs 340A and 340B include indications of either current operating modes or requested operating modes indicating a number of enabled execution pipelines used for relatively high power consuming instruction types. In one embodiment, an active processor within one of the processor complexes has a current operating mode in which one relatively high power execution pipeline is enabled. The total weight generator 366 may determine such a configuration has a weight of one for the processor.

In another example, the active processor may have another mode in which all execution pipelines are enabled. The total weight generator 366 may determine such a configuration may have weight of 2 (or 3, or 4, depending on the relative power consumption difference and/or the number of execution pipelines). This weight may be summed with weights of other processors in the separate processor complexes to generate a total weight. In other embodiments, a bit vector is used to represent the operating mode of the processor and provided on input 340A. In some embodiments, the total weight generator 366 may concatenate or otherwise combine the bit vector with bit vectors of other processors in the separate processor complexes, and use the final vector to index a table and read out a total weight.

Field 314 stores region weight thresholds. When the total weight does not exceed the maximum weight found in field 312, the control logic 364 in the control unit 370 may compare the generated total weight with the weight thresholds in field 314. As shown, each row in the DVFM table 330 may include a different number of weight thresholds. Additionally, the weight thresholds may be the same or different from weight thresholds in other rows. The comparisons determine an amount of supply voltage reduction, and thus, an amount of voltage margin recovery.

The amount of voltage margin recovery is stored in field 316. For example, for the P-state 2, the amounts of the voltage margin recovery are shown as $V_{r6}$, $V_{r7}$, and $V_{r8}$, in field 316 corresponding to the weight thresholds $w_6$, $w_7$, and $w_8$ in field 314. The selected one of the supply voltage reductions (amount of voltage margin recovery) $V_{r6}$, $V_{r7}$, and $V_{r8}$ is subtracted from the safe power supply voltage magnitude $V_{nominal}$ in field 318 of the same row by the voltage adjustment logic 360 in the control unit 370. The voltage adjustment logic 360 may convey the adjusted supply voltage magnitude to the power manager via the adjusted operating parameters 352.

Field 320 stores an operational clock frequency corresponding to the P-state stored in field 310. In various embodiments, the DVFM table 330 is in one of the two processor complexes as shown earlier in FIG. 1. Therefore, the operational frequency is for the processor complex storing the DVFM table 330. The other processor complex is capable of selecting a corresponding operational frequency corresponding to the same P-state. As the two processor complexes share a single power plane, the operational supply voltage is the same for the two processor complexes while the operational frequency is different for the same P-state.

In other embodiments, the DVFM table 330 stores both operational frequencies in separate fields. Although two processor complexes are show to be sending requests on inputs 340A-340B and receiving responses on outputs 342A-342B, any number of processor complexes sharing a same power plane while using different clock domains is possible and contemplated. The response 342A-342B include an indication of a grant for the earlier request when the grant is ready.

Figure 4:
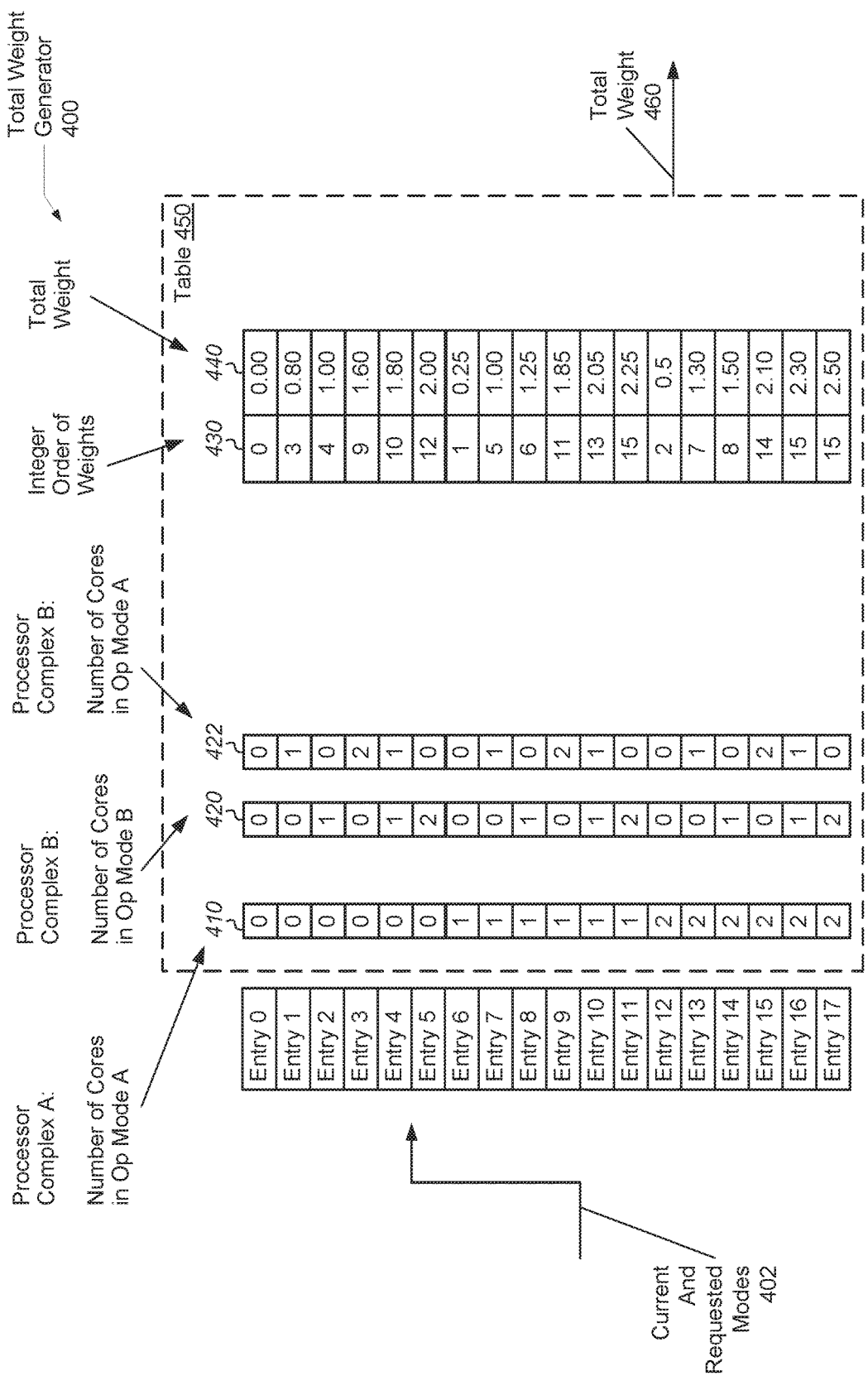
FIG. 4 is a block diagram of one embodiment of a weight generator.

Referring now to FIG. 4, a generalized block diagram of one embodiment of a weight generator 400 is shown. In the illustrated embodiment, the table 450 is used to generate the total weight, rather than dynamically calculating a weighted sum. As shown, the table 450 includes input fields (columns) 410-422 and output fields (columns) 430-440. In various embodiments, only one of the output fields 430-440 is sent out from the table 450.

Field 440 stores the actual weights corresponding to the combination of the inputs. As the actual weights are non-integers, in various embodiments, the weights are translated to integer values which are included in field 430. The integer values in field 430 also provide an ordering of the amount of power supply load on the single power plane shared by the two separate processor complexes. The weights shown in field 440 may not actually be stored in the table 450, but rather maintained externally. As the integer values stored in field 430 are programmable. As the weights are updated externally, the programmable integer values stored in field 430 may be also updated accordingly. The actual weights may be determined by a combination of simulations and actual measurements of manufactured parts.

As shown, a first processor complex, Complex A, has one active operating mode indicated by Mode A. The second processor complex, Complex B, has two active operating modes indicated by Mode A and Mode B. In this example, the Mode A corresponds to one enabled pipeline used for a relatively high power consuming instructions while the Mode B corresponds to three enabled pipelines used for the relatively high power consuming instructions. As Complex A does not have three execution pipelines, it is capable of offering only Mode A. Each of the Complex A and Complex B shares a single power plane while using different operational frequencies from different clock domains.

As shown, field 410 stores a number of cores in Complex A which are currently processing instructions in the operating mode A or are requesting to process instructions in the operating mode A. Field 420 stores a number of cores in the second Complex B which are currently processing instructions in the operating mode B or are requesting to process instructions in the operating mode B. Field 430 is similar to field 410 but corresponds to the second Complex B. The counts are concatenated and can be used for comparisons during a table indexing operation. The row with the counts matching the values on the input 402 is selected and the corresponding integer value stored in field 430 is provided on output 460. For example, when Complex A has two cores currently operating in Mode A, and Complex B has no active cores, but requests to put one core in Mode B, the input 402 includes the values 2, 1 and 0. Accordingly, entry 14 is selected and the integer value 8 is provided on the output 460.

Figure 5:
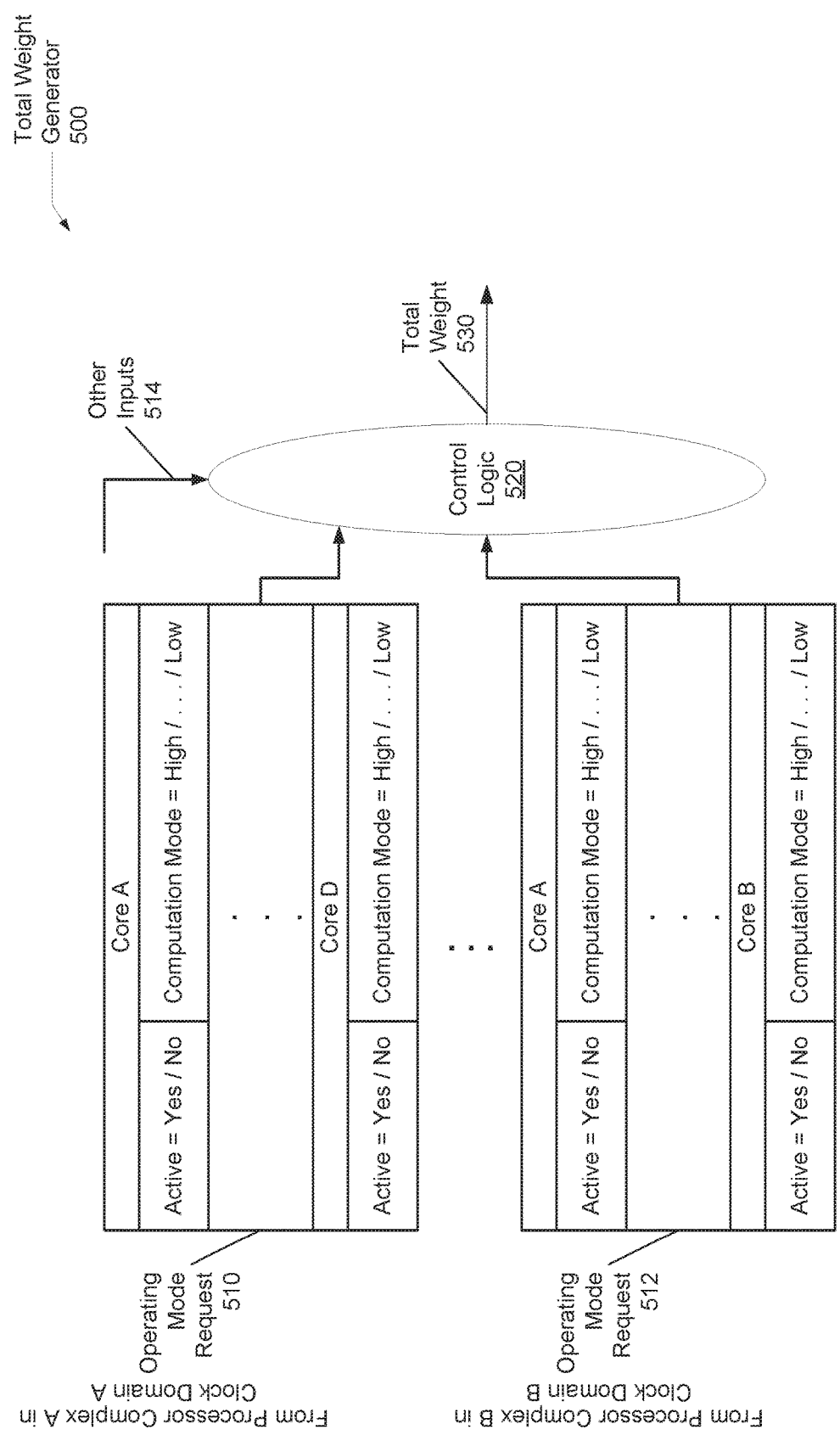
FIG. 5 is a block diagram of another embodiment of a weight generator.

Referring now to FIG. 5, a generalized block diagram of another embodiment of a weight generator 500 is shown. As shown, requests are provided on inputs 510 and 512 from two processor complexes sharing a single power plane but operating with different clock domains. As described earlier, the inputs 510 and 512 may include counts of cores currently operating in a particular operating mode or requesting to transition to the particular operating mode. In other embodiments, a bit vector is used with a one-hot encoding or a one-cold encoding. The control logic 520 may combine the bit vectors, such as concatenating them, to index one or more tables. Alternatively, the control logic 520 combines the bit vectors in a weighted sum where each bit position corresponds to a particular weight. The weights may be programmable. The generated total weight is provided on the output 530. As described earlier, the P-state may also be used for generating the total weight and it can be provided on the input 514.

Figure 6:
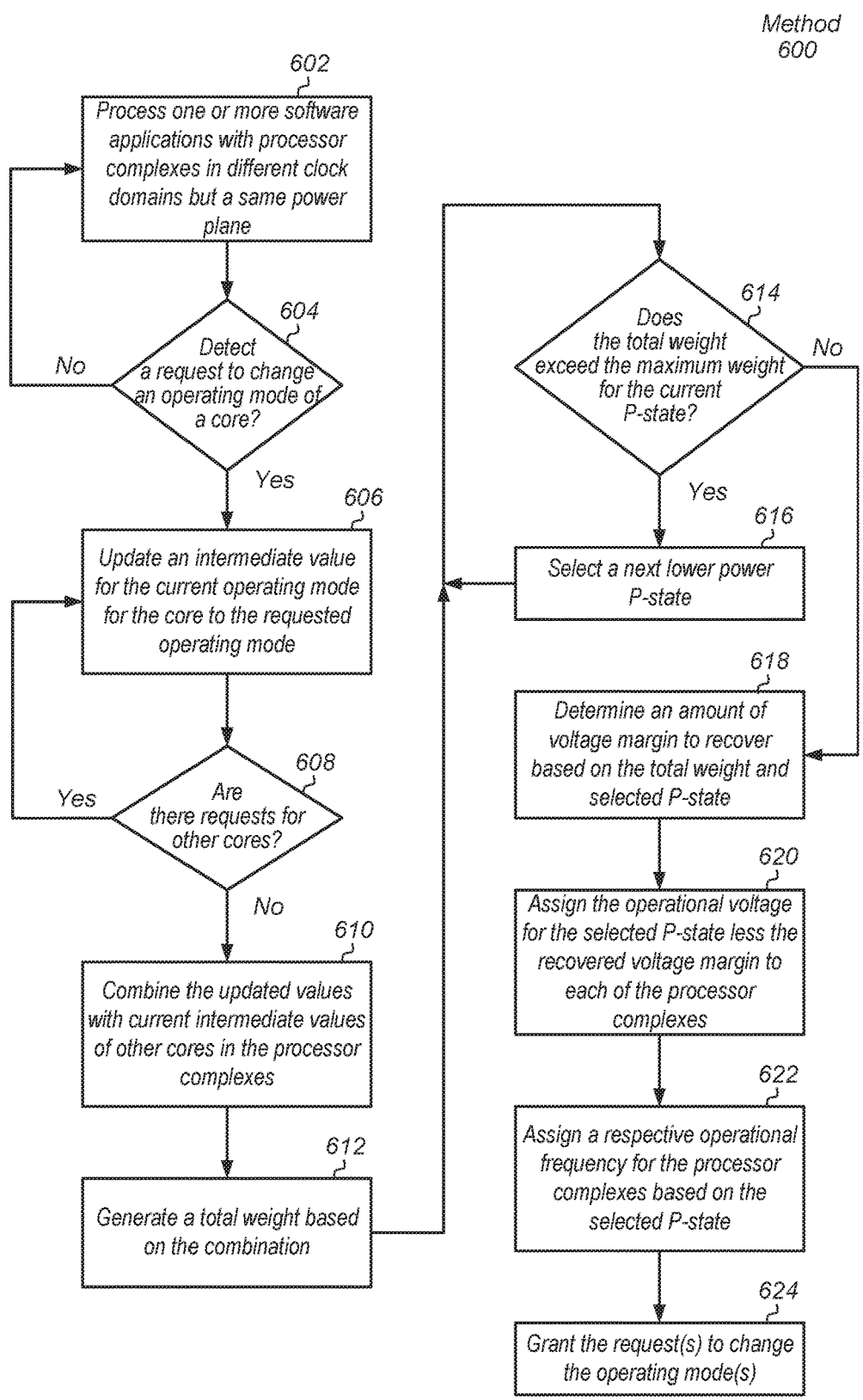
FIG. 6 is a flow diagram of one embodiment of a method for reaching power targets across different clock domains.

Referring now to FIG. 6, a generalized flow diagram of one embodiment of a method 600 for reaching power targets across different clock domains is shown. For purposes of discussion, the steps in this embodiment are shown in sequential order. However, in other embodiments some steps may occur in a different order than shown, some steps may be performed concurrently, some steps may be combined with other steps, and some steps may be absent.

One or more software applications are processed by at least two processor complexes in different clock domains but powered by a same power plane (block 602). In various embodiments, each of the at least two processor complexes include multiple processor cores. If a request is detected to change an operating mode of a core ("yes" leg of the conditional block 604), then an intermediate value for the current operating mode for the core is updated to the requested operating mode (block 606). Based on the detected request, the intermediate value for the particular core is updated from the current value to the requested value prior to the request is granted. The updated value is used for determining an amount of voltage margin recovery to use for possibly reducing the selected operational voltage for each of the first processor complex and the second processor complex. The intermediate values are used to generate a total weight indicating a power supply load provided by the multiple cores of the multiple processor complexes on the single power plane. In various embodiments, larger weights indicate larger power supply loads and a larger possibility for voltage droop to occur while lower weights indicate smaller power supply loads and a smaller possibility for voltage droop to occur.

In some embodiments, the intermediate value is part of a weighted sum dynamically calculated for each core in the multiple processor complexes. The weight sum generates a total weight used to determine an amount of a supply voltage reduction in order to recover all or part of a voltage margin. In other embodiments, the immediate value is part of a bit vector used to index a table to generate the total weight.

In some embodiments, an intermediate value for a particular core is a bit vector indicating one or more of an active/sleep state and an operating mode of one or more operating modes the core is capable of using. In one embodiment, each bit position in the vector indicates a particular operating mode. In such embodiments, either a one-hot encoding or a one-cold encoding is used to indicate which operating mode is currently being used, or alternatively, which operating mode is currently being requested. In one embodiment, when a one-hot encoding is being used and each bit position is deasserted, the vector indicates the particular core is in a sleep state.

For a particular core capable of operating in one of three active operating modes, the transitions from sleep state to each of the possible active operating modes appear, in one example using a one-hot encoding, as 3b000, 3b001, 3b010 and 3b100. The indication "3b" indicates a binary value using 3 bits. In another embodiment, a particular bit position is reserved for indicating the sleep state and in such a case the remaining bits of the vector are ignored. For the particular core capable of operating in one of three active operating modes, the transitions from between the possible active operating modes appear, in one example, as 4b0001, 4b0010 and 4b0100. The sleep state appears as 4b1010 where the 3 least-significant bits are treated as don't care values. Based on the detected request, the bit vector for the particular core is updated from the current value to the requested value prior to the request is granted. The particular core does not yet transition to the requested operating mode, but the updated bit vector is use to determine potentially updated voltage and frequency operating values.

In some embodiments, the bit vectors for the multiple cores of the multiple processor complexes are concatenated and used to index a table. Each entry of the table stores a weight corresponding to the configuration of the multiple cores of the multiple processor complexes. The weight read out from the table is the total weight. In various embodiments, the entries of the table are programmable and therefore the total weights corresponding to different configurations of the multiple cores of the multiple processor complexes are programmable.

In other embodiments, the multiple cores are divided into groups, and the bit vectors for each group are concatenated and used to index into respective tables. Each entry of the separate tables stores a weight corresponding to a particular group. The multiple weights are summed to generate a total weight. In some embodiments, the groups correspond to processor complexes. For example, a first group corresponds to the multiple cores in a first processor complex, and a second group corresponds to the multiple cores in a second processor complex. In other embodiments, the groups correspond to operating modes. For example, a first group corresponds to a first active operating mode which cores in one or more of the first processor complex and the second processor complex are capable of using, and a second group corresponds to a second active operating mode which cores in one or more of the first processor complex and the second processor complex are capable of using.

In other embodiments, a count is maintained on a basis of operating modes. For a particular operating mode, a count of a number of cores currently processing a workload in the particular operating mode is maintained. In some embodiments, the count is maintained on a processor complex basis. In other embodiments, the count is a total count associated with all cores in both the first processor complex and the second processor complex. Similar to the implementation using bit vectors, the count is updated based on a request for a particular core to transition to using the particular operating mode. In some embodiments, the counts are used to index one or more tables to read out one or more weights. When multiple weights are used, they are combined such as in a summation operation. In other embodiments, a weight is associated with each of the operating modes and the counts are combined in a weighted sum.

In yet other embodiments, indications of the operating modes of the cores, such as the bit vectors or counts, are combined with indications of time duration the cores are in the respective operating modes. In further embodiments, indications of the operating modes of the cores are combined with the power-performance states (P-states) of the cores. These and other combinations are possible and contemplated. Again, based on the detected request, whether the intermediate value is a weighted value used in a weighted sum, a combination of values, a bit vector or other, the intermediate value for the particular core is updated from its current value to the requested value prior to the request is granted.

If there are requests for other cores ("yes" leg of the conditional block 608), then control flow of method 600 returns to block 606 where respective intermediate values for the current operating modes for the other cores are updated to the requested operating modes. If there are no further requests for other cores ("no" leg of the conditional block 608), then the updated values are combined with current intermediate values of other cores in the processor complexes (block 610). Any one of a variety of methods for combining is used. Examples of combining include the weight sum, the indexing of tables and so forth as described earlier. The combination generates a total weight (block 612). In some embodiments, a measured time duration is used to determine when to generate the total weight in addition to detecting any further requests. In some embodiments, an upper limit for the time duration is used to remove any delay in generating the total weight based on frequent detected requests. In other examples, a lower limit for the time duration is used to avoid hysteresis and frequent changes to the operational voltage supplied to the multiple processor complexes sharing the single power plane.

In various embodiments, a programmable maximum weight is maintained for each supported P-state. The maximum weight represents the maximum power supply load supported for the particular P-state. If the total weight exceeds the maximum weight for the current P-state ("yes" leg of the conditional block 614), then a next lower power P-state is selected (block 616). A check is performed again to verify whether the total weight exceeds the maximum weight for the current P-state (conditional block 614). If not ("no" leg of the conditional block 614), then an amount of voltage margin to recover is determined based on the total weight and selected P-state (block 618). For example, the total weight is compared to one or more weight thresholds corresponding to different voltage margins to recover for varying power supply loads.

The operational voltage for the selected P-state less the recovered voltage margin is assigned to each of the multiple processor complexes sharing the same power plane (block 620). A respective operational frequency for the multiple processor complexes is assigned based on the selected P-state (block 622). Afterward, the one or more requests for operation mode changes are granted (block 624).

Figure 7:
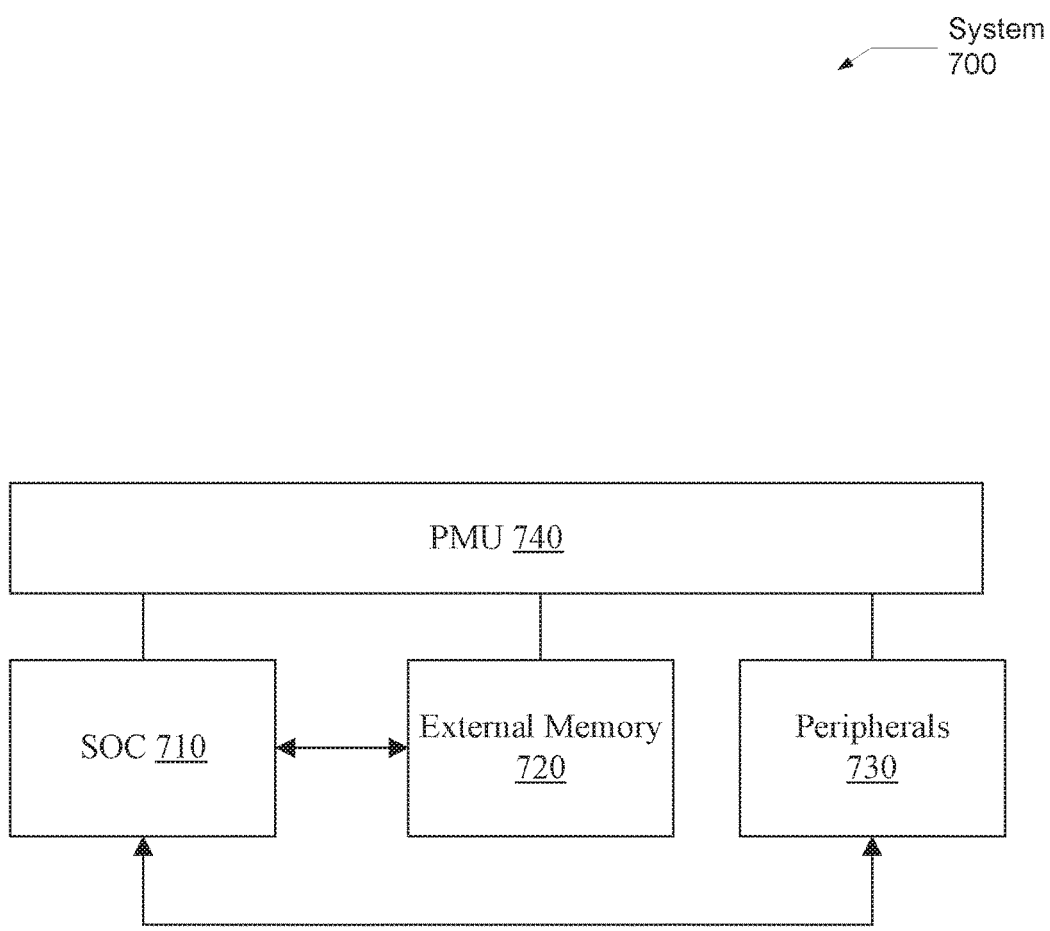
FIG. 7 is a block diagram of one embodiment of a system.

Turning next to FIG. 7, a block diagram of one embodiment of a system 700 is shown. In the illustrated embodiment, the system 700 includes at least one instance of the system on a chip (SOC) 710 coupled to one or more peripherals 730 and the external memory 720. The power management unit (PMU) 740 is provided which supplies the supply voltages to the SOC 710 as well as one or more supply voltages to the memory 720 and/or the peripherals 730. In some embodiments, more than one instance of the SOC 710 may be included (and more than one memory 720 may be included as well).

The peripherals 730 may include any desired circuitry, depending on the type of system 700. For example, in one embodiment, the system 700 may be a mobile device (e.g. personal digital assistant (PDA), smart phone, etc.) and the peripherals 730 may include devices for various types of wireless communication, such as Wi-Fi, Bluetooth, cellular, global positioning system, etc. The peripherals 730 may also include additional storage, including RAM storage, solid state storage, or disk storage. The peripherals 730 may include user interface devices such as a display screen, including touch display screens or multitouch display screens, keyboard or other input devices, microphones, speakers, etc. In other embodiments, the system 700 may be any type of computing system (e.g. desktop personal computer, laptop, workstation, net top etc.).

The external memory 720 may include any type of memory. For example, the external memory 720 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 720 may include one or more memory modules to which the memory devices are mounted, such as single inline memory modules (SIMMs), dual inline memory modules (DIMMs), etc. Alternatively, the external memory 720 may include one or more memory devices that are mounted on the SOC 710 in a chip-on-chip or package-on-package implementation.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system on a chip comprising:
a first processor complex comprising a first plurality of cores capable of operating in a first plurality of modes, wherein the first processor complex is powered by a power plane and operates in a first clock domain;
a second processor complex comprising a second plurality of cores capable of operating in a second plurality of modes, wherein the second processor complex is powered by the power plane and operates in a second clock domain different from the first clock domain;
a power state controller configured to:
receive a request to change a given core of either the first plurality of cores or the second plurality of cores from a first operating mode to a second operating mode, wherein the second operating mode has a power supply load which is not a worst-case power supply load;
determine an amount of voltage margin to recover, wherein to determine said voltage margin the power state controller is configured to:
generate a total weight based on:
the given core as if it were operating in the requested second operating mode, prior to the given core actually being assigned the second operating mode; and
cores of the first plurality of cores and the second plurality of cores, other than the given core, operating in current operating modes; and
select a supply voltage reduction based on comparing the generated total weight to one or more weight thresholds that correspond to one or more supply voltage reductions; and
assign an operational voltage less the amount of voltage margin to the first processor complex and the second processor complex.

2. The system on a chip as recited in claim 1, wherein
the first processor complex is assigned a first clock frequency in the first clock domain based on the assigned operational voltage; and
the second processor complex is assigned a second clock frequency in the second clock domain based on the assigned operational voltage, wherein the second clock frequency is different from the first clock frequency.

3. The system on a chip as recited in claim 1, wherein the power state controller is further configured to grant the request to change the given core to operate in the second operating mode after at least assigning the operational voltage less the amount of voltage margin to recover to each of the first processor complex and the second processor complex.

4. The system on a chip as recited in claim 1, wherein the power state controller is further configured to select the operational voltage based on a current power-performance state (P-state) for the first processor complex and the second processor complex responsive to determining the generated total weight is not greater than a maximum weight threshold corresponding to the current P-state.

5. The system on a chip as recited in claim 4, wherein the power state controller is further configured to select the operational voltage based on a less power P-state than the current P-state responsive to determining the generated total weight is greater than the maximum weight threshold.

6. The system on a chip as recited in claim 5, wherein power state controller is further configured to select the one or more weight thresholds corresponding to the one or more supply voltage reductions for comparing to the generated total weight based on the P-state used to select the operational voltage.

7. A method comprising:
operating a first plurality of cores of a first processor complex in a first plurality of modes, wherein the first processor complex is powered by a power plane and operates in a first clock domain;
operating a second plurality of cores of a second processor complex in a second plurality of modes, wherein the second processor complex is powered by the power plane and operates in a second clock domain different from the first clock domain;
receiving a request to change a given core of either the first plurality of cores or the second plurality of cores from a first operating mode to a second operating mode, wherein the second operating mode has a power supply load which is not a worst-case power supply load;
determining an amount of voltage margin to recover, wherein said determining comprises:
generating a total weight based on:
the given core as if it were operating in the requested second operating mode, prior to the given core actually being assigned the second operating mode; and
cores of the first plurality of cores and the second plurality of cores, other than the given core, operating in current operating modes; and
selecting a supply voltage reduction based on comparing the generated total weight to one or more weight thresholds that correspond to one or more supply voltage reductions; and
assigning an operational voltage less the amount of voltage margin to recover to the first processor complex and the second processor complex.

8. The method as recited in claim 7, further comprising:
assigning a first clock frequency in the first clock domain to the first processor complex based on the assigned operational voltage; and
assigning a second clock frequency in the second clock domain to the second processor complex based on the assigned operational voltage, wherein the second clock frequency is different from the first clock frequency.

9. The method as recited in claim 7, further comprising granting the request to change the given core to operate in the second operating mode after at least assigning the operational voltage less the amount of voltage margin to recover to the first processor complex and the second processor complex.

10. The method as recited in claim 7, further comprising selecting the operational voltage based on a current power-performance state (P-state) for the first processor complex and the second processor complex responsive to determining the generated total weight is not greater than a maximum weight threshold corresponding to the current P-state.

11. The method as recited in claim 10, further comprising selecting the operational voltage based on a less power P-state than the current P-state responsive to determining the generated total weight is greater than the maximum weight threshold.

12. The method as recited in claim 11, further comprising selecting the one or more weight thresholds corresponding to the one or more supply voltage reductions for comparing to the generated total weight based on the P-state used to select the operational voltage.

13. A power state controller comprising:
a first interface configured to receive requests for operating mode changes from a first processor complex comprising a first plurality of cores capable of operating in a first plurality of modes, wherein the first processor complex is powered by a power plane and operates in a first clock domain;
a second interface configured to receive requests for operating mode changes from a second processor complex comprising a second plurality of cores capable of operating in a second plurality of modes, wherein the second processor complex is powered by the power plane and operates in a second clock domain different from the first clock domain;
a control unit configured to:
receive a request to change a given core of either the first plurality of cores or the second plurality of cores from a first operating mode to a second operating mode, wherein the second operating mode has a power supply load which is not a worst-case power supply load;
determine an amount of voltage margin to recover, wherein to determine said voltage margin the power state controller is configured to:
generate a total weight based on:
the given core as if it were operating in the requested second operating mode, prior to the given core actually being assigned the second operating mode; and
cores of the first plurality of cores and the second plurality of cores, other than the given core, operating in current operating modes; and
select a supply voltage reduction based on comparing the generated total weight to one or more weight thresholds that correspond to one or more supply voltage reductions; and
assign an operational voltage less the amount of voltage margin to the first processor complex and the second processor complex.

14. The power state controller as recited in claim 13, wherein the control unit is further configured to select the operational voltage based on a current power-performance state (P-state) for the first processor complex and the second processor complex responsive to determining the generated total weight is not greater than a maximum weight threshold corresponding to the current P-state.

* * * * *